United States Patent
Hanawa et al.

(10) Patent No.: US 8,348,005 B2
(45) Date of Patent: Jan. 8, 2013

(54) HYBRID VEHICLE

(75) Inventors: Kaoru Hanawa, Wako (JP); Takashi Tsutsumizaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 219 days.

(21) Appl. No.: 12/881,180

(22) Filed: Sep. 14, 2010

(65) Prior Publication Data
US 2011/0073391 A1  Mar. 31, 2011

(30) Foreign Application Priority Data

Sep. 30, 2009  (JP) .................................. 2009-228300

(51) Int. Cl.
*B60K 6/42* (2007.10)

(52) U.S. Cl. .................. 180/292; 180/65.21; 180/65.22; 180/291

(58) Field of Classification Search ............... 180/65.21, 180/65.22, 230, 292, 297, 337, 344; 74/335, 74/336.5, 337.5
See application file for complete search history.

(56) References Cited

U.S. PATENT DOCUMENTS 7,520,351 B2 * 4/2009 Uchisasai et al. ......... 180/65.245
7,954,584 B2 * 6/2011 Tsukada et al. ............... 180/219

FOREIGN PATENT DOCUMENTS

JP  2008-080986  4/2008

\* cited by examiner

*Primary Examiner* — J. Allen Shriver, II
*Assistant Examiner* — Brian Cassidy
(74) *Attorney, Agent, or Firm* — Ditthavong Mori & Steiner, P.C.

(57) ABSTRACT

A hybrid vehicle includes an engine, a motor, a multi-stage gear transmission, and an actuator. The engine has a crankshaft, a crankcase, and a cylinder. The motor is provided on the crankshaft. Through the multi-stage gear transmission, an output of the crankshaft is changed to be used for traveling of the vehicle. The actuator is configured to automatically shift the multi-stage gear transmission and is provided in the crankcase in proximity to the motor. A radius from a center line of the cylinder to a part of the actuator farthest from the center line is shorter than a radius from the center line to a part of the motor farthest from the center line. The actuator has a width less than a width of the motor in a direction perpendicular to the crankshaft.

14 Claims, 5 Drawing Sheets

HYBRID VEHICLE

CROSS-REFERENCE TO RELATED APPLICATIONS

The present application claims priority under 35 U.S.C. §119 to Japanese Patent Application No. 2009-228300, filed Sep. 30, 2009. The contents of this application are incorporated herein by reference in their entirety.

BACKGROUND OF THE INVENTION

1. Technical Field

This invention relates to a hybrid vehicle.

2. Background Art

From the standpoint of an improvement in fuel efficiency, a hybrid vehicle using a combination of an engine (internal combustion engine) and a motor (electric motor) is proposed (see JP-A No. 2008-080986 (FIG. 3), for example).

As shown in FIG. 3 of JP-A No. 2008-080986, a power unit (18) (a parenthesized number indicates a reference sign described in JP-A No. 2008-080986, the same shall apply hereinafter) includes a hybrid engine including a motor/generator (36) in addition to an internal combustion engine (26) in which an air-fuel mixture is ignited by an ignition plug (54) to cause an explosion in a combustion chamber (26a).

A transmission (42) is provided in a lower portion of the internal combustion engine (26). For shifting gears, a shift drum (112) in the transmission (42) is rotated. The shift drum (112) is rotated by a shift pedal depressed by a rider (JP-A No. 2008-080986, paragraph 0039, line 1).

A vehicle (particularly, a motorcycle) in which a rider operates the shift pedal to mechanically operate a transmission (42) through the link therebetween is widely available.

Also, a system is proposed in response to automation requirement in recent years, in which information on operation of a transmission operating element is converted into an electric signal without mechanical coupling between the transmission operating element and a transmission so that an actuator is controlled based on the electric signal and thus the actuator rotates the transmission. In this system, since the actuator rotates the transmission, a force required for the rotation can be freely set, increasing design flexibility.

On the other hand, the actuator is mounted, for example, in a crankcase. However, since the crankcase does not have sufficiently much inner space, the major portion of the actuator protrudes outside the crankcase. In the hybrid engine, an increase in size of the engine is expected due to the overhang of the actuator in addition to the overhang of the motor. If the amount of overhang is to be decreased, the range of design flexibility will be almost always narrowed. As a result, a decrease in design flexibility is expected.

To avoid this, a hybrid vehicle needs preferable layout to provide an actuator in a transmission mechanism.

SUMMARY OF INVENTION

According to one aspect of the present invention, a hybrid vehicle includes an engine, a motor, a multi-stage gear transmission, and an actuator. The engine has a crankshaft, a crankcase, and a cylinder. The motor is provided on the crankshaft. Through the multi-stage gear transmission, an output of the crankshaft is changed to be used for traveling of the vehicle. The actuator is configured to automatically shift the multi-stage gear transmission and is provided in the crankcase in proximity to the motor. A radius from a center line of the cylinder to a part of the actuator farthest from the center line is shorter than a radius from the center line to a part of the motor farthest from the center line. The actuator has a width less than a width of the motor in a direction perpendicular to the crankshaft.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

An embodiment of the present invention will be described below with reference to the accompanying drawings. Incidentally, the drawings will be looked at in the orientation of the reference signs.

[Embodiments]

An embodiment according to the present invention will be described with reference to the drawings. Note that the hybrid vehicle is described by taking a hybrid motorcycle as an example, but the hybrid vehicle may be a hybrid three-wheeled vehicle or a hybrid four-wheeled vehicle. Also, terms "front", "rear", "right" and "left" refer to directions in which a rider sitting in the seat views.

Figure 1:
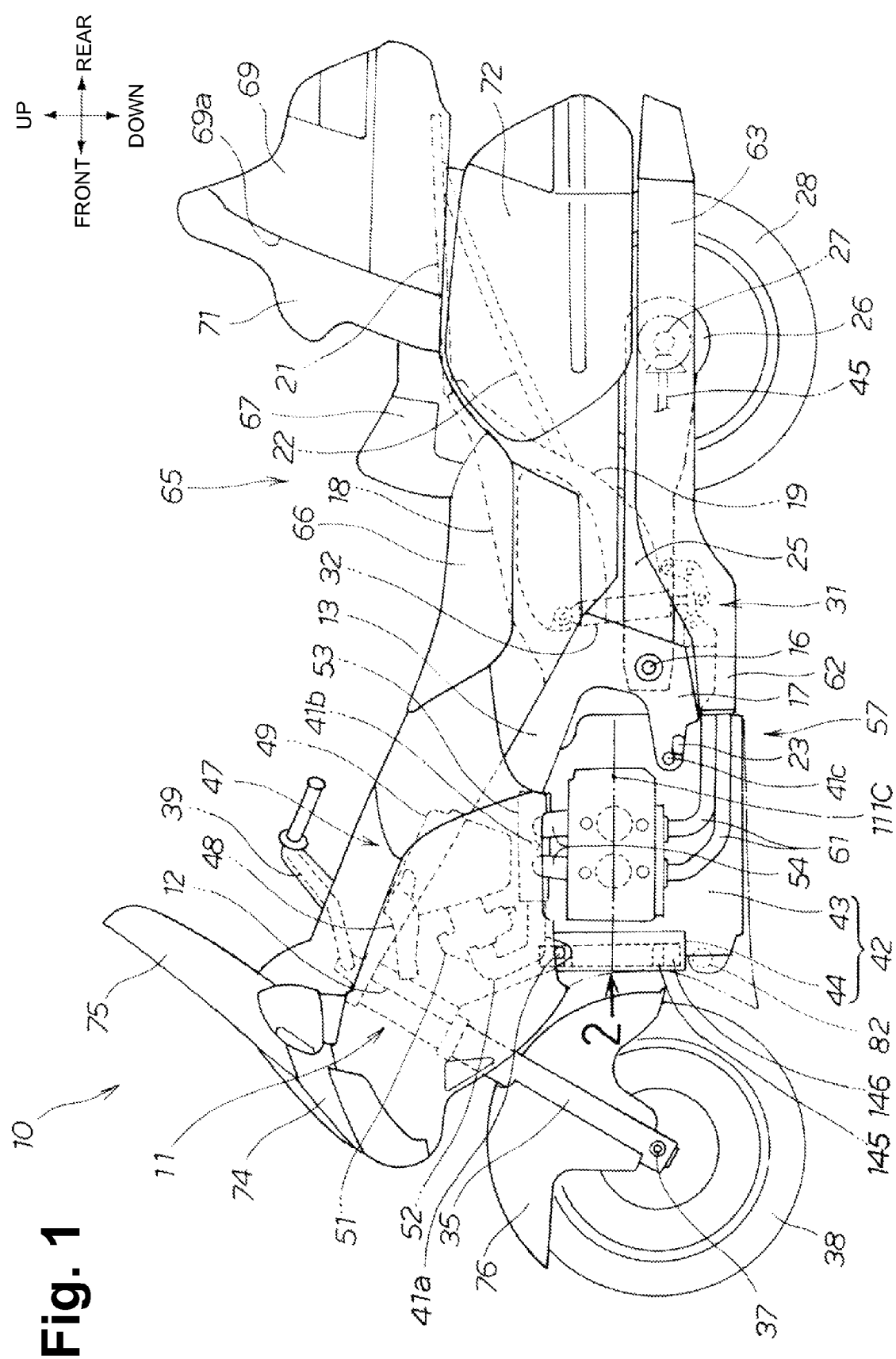
FIG. 1 is a left-side view of a hybrid vehicle according to the embodiment of the present invention.

As shown in FIG. 1, a hybrid vehicle 10 is a motorcycle which includes a vehicle frame 11 mounted with a head pipe 12, a main frame 13 extending rearward from the head pipe 12, a pivot plate 17 attached to the rear end of the main frame 13 and having a pivot shaft 16, a seat rail 18 extending diagonally upward and rearward from a rear upper portion of the pivot plate 17, a middle frame 19 coupling between the rear end of the seat rail 18 and a middle portion of the pivot plate 17 to support the seat rail 18, a sub-frame 21 extending rearward from the top end of the middle frame 19, and a seat stay 22 extending between the rear of the sub-frame 21 and the middle frame 19.

A step 23 which is an occupant footrest is mounted near the rear lower end of the main frame 13.

Note that the main frames 13, pivot plates 17, seat rails 18, middle frames 19, seat stays 22 and the steps 23 are mounted on the right and left sides of the center line in the vehicle transverse direction.

A rear swing arm 25, which can vertically swing about the pivot shaft 16, is attached to the pivot plate 17. A final reduction gear 26 is integrally placed at the rear end of the rear swing arm 25. A rear-wheel axle 27 is provided on the final reduction gear 26. A rear wheel 28 is attached to the rear-wheel axle 27.

A rear cushion unit 32 is uprightly attached through a link mechanism 31 to a middle portion of the rear swing arm 25. The top end of the rear cushion unit 32 is attached to the main frame 13.

A front fork 35 is steerably mounted on the head pipe 12. A front wheel 38 is attached through a front-wheel axle 37 to the front fork 35. A steering handlebar 39 is mounted on the top end of the front fork 35.

A power unit 42 is hung through the fastening members 41a to 41c in a lower position than the main frame 13. The power unit 42 is a hybrid drive source which includes a flat four-cylinder engine 43 (hereinafter also referred to as "engine 43"), and a motor 44 disposed in a forward part of the engine 43. The engine 43 is a water-cooled engine. The axis 111C of the crankshaft of the engine 43 extends in the fore-and-aft direction of the vehicle, and the motor 44 is located on the front part of the crankshaft.

The driving force is transmitted from the engine 43 to the drive shaft 45, and then decelerated by the final reduction gear 26 which is located at the rear end of the drive shaft 45, while the direction of the rotating shaft is changed from the vehicle longitudinal direction to the vehicle transverse direction before the driving force is transmitted to the rear wheel 28.

An intake-system member 47 is placed above the engine 43.

The intake-system member 47 includes an air cleaner 49 which includes an air duct 48 for introducing outside air, a throttle body 51 which is coupled to the air cleaner 49, an intake manifold 52 which extends from the throttle body 51, a surge tank 53 which is placed at the leading end of the intake manifold 52 for storing an air-fuel mixture, and intake manifolds 54 which extends from the surge tank 53 to introduce the air-fuel mixture into each cylinder of the engine 43.

An exhaust-system member 57 is placed under the engine 43.

The exhaust-system member 57 includes exhaust pipes 61 which extend from the respective cylinders of the engine 43, and a collective pipe 62 to which the exhaust pipes 61 are collectively connected, and a muffler 63 which extends rearward from the collective pipe 62.

An occupant seat in which an occupant sits is provided on the seat rail 18.

The occupant seat 65 is made up of a combination of a forward seat 66 and a rearward seat 67 which is disposed behind and close to the forward seat 66.

A trunk 69 is attached to the sub-frame 21 for storing baggage, and a backrest 71 is attached to the front wall 69a of the trunk 69 for holding the back of the occupant. A side bag 72 is attached to the sub-frame 21.

A front cowl 74, which covers the front of the vehicle, is attached to the head pipe 12, and a front shield 75 serving as a windshield is attached to the front cowl 74. A front fender 76, serving as a mudguard placed above the front wheel 38 so as to cover the same, is provided to the front fork 35.

Figure 2:
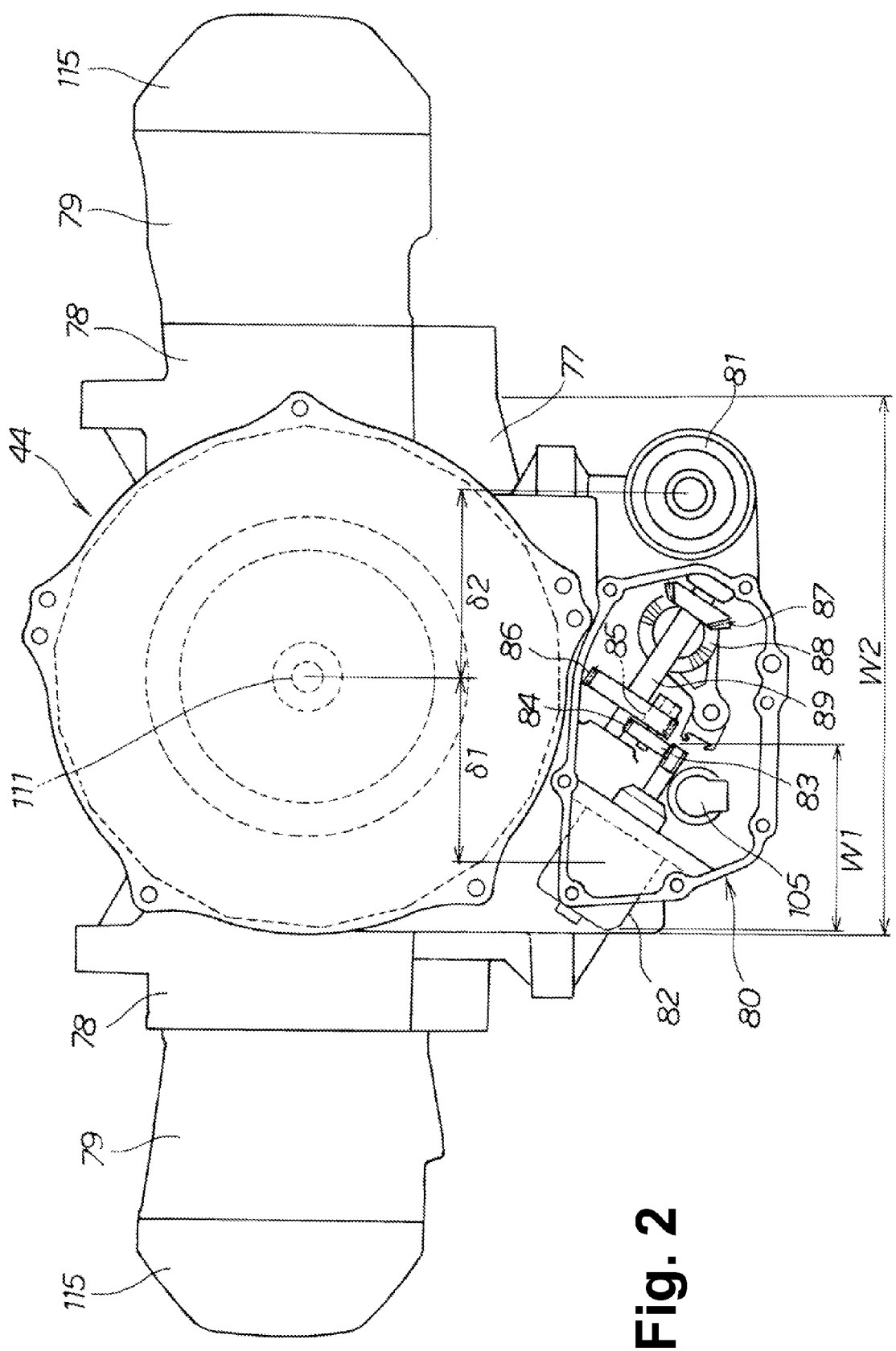
FIG. 2 is a view on arrow 2 in FIG. 1.

As shown in FIG. 2, a main section of the power unit 42 has a form when viewed from the front.

As shown in FIG. 2, the motor 44 is seen at the center, and the crankcase 77 is seen behind the motor 44. Further, cylinder blocks 78 (described later in detail) and cylinder heads 79 extend rightward and leftward from the crankcase 77.

An automatic transmission mechanism 80 is housed in a lower portion of the crankcase 77 (i.e., under the motor 44). In addition, an oil filter 81 is provided for filtering a lubricant in the lower portion of the crankcase 77 such that it is adjacent to the automatic transmission mechanism 80.

Preferably, the center of the actuator 82 is disposed offset toward one side of the vehicle (specifically, offset from the center of the motor 44 by δ1), while the center of the oil filter 81 is disposed offset toward the other side of the vehicle (specifically, offset from the center of the motor 44 by δ2). In this manner, the actuator 82 and the oil filter 81 which is an auxiliary machine component can be placed in a compact arrangement.

The automatic transmission mechanism 80 includes an actuator 82 which is a drive source, gears 83, 84, 85 and 86 which decelerate the output of the actuator 82, and a first bevel gear 87 which is rotated by the gear 86. That is, the gear 86 and the first bevel gear 87 are integrally connected through a shaft 89.

A second bevel gear 88 rotated by the first bevel gear 87 and subsequent components will be described with reference to the next drawing.

Figure 3:
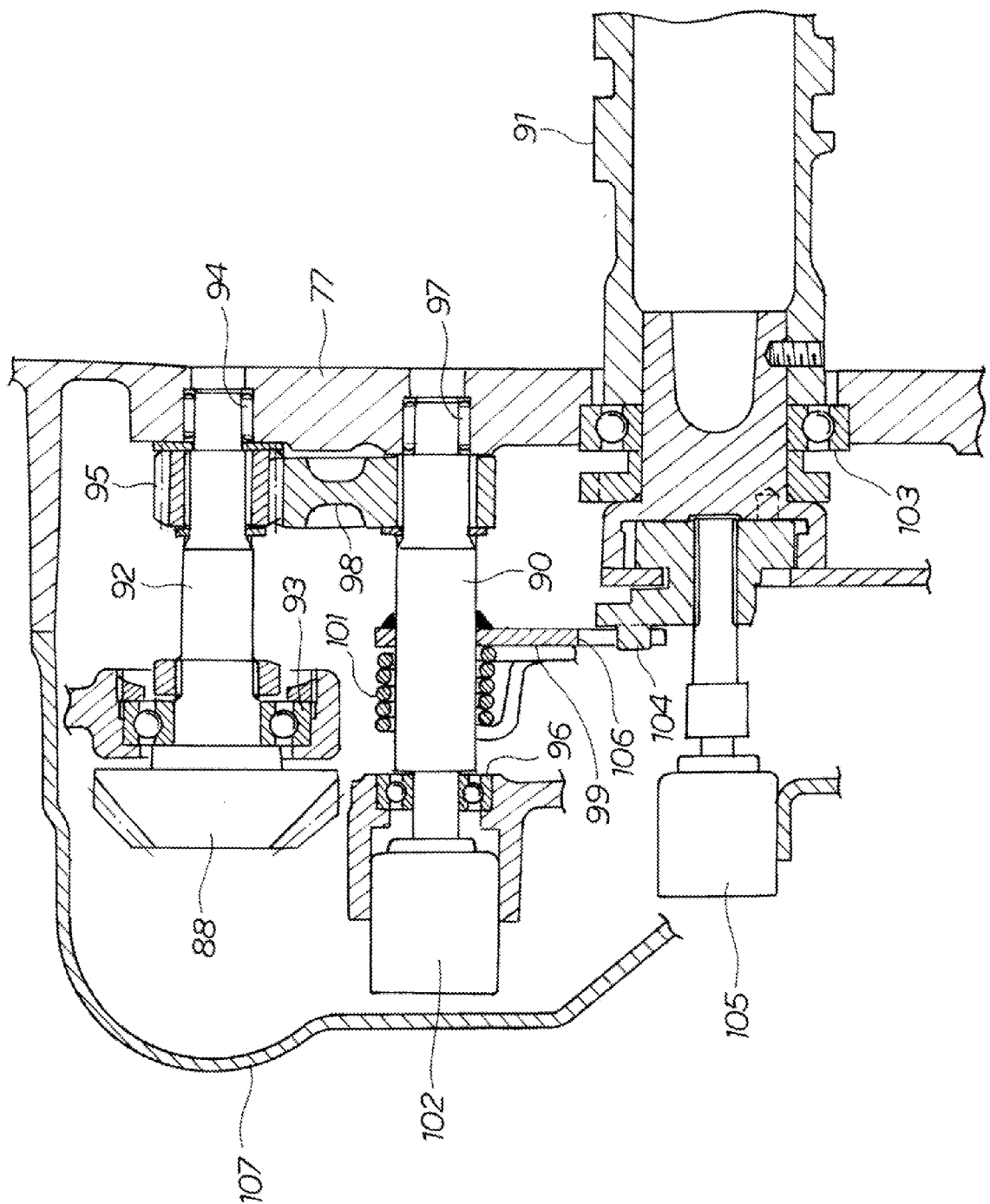
FIG. 3 is a diagram illustrating a drive system from a second bevel gear to a shift drum.

A shaft 92 of the second bevel gear 88 shown in FIG. 3 extends parallel to the crankshaft. A change shaft 90 is disposed parallel to the shaft 92 and a shaft-shaped shift drum 91 is disposed parallel to the change shaft 90.

The shaft 92 of the second bevel gear 88 is rotatably supported by bearings 93 and 94 in the crankcase 77, and is provided with a drive gear 95.

The change shaft 90 is also rotatably supported by bearings 96 and 97 in the crankcase 77, and is provided with a driven sector gear 98 driven by the drive gear 95, while it is also provided with an arm-shaped change arm 99, a pinching spring 101, and a change-shaft rotation angle sensor 102 mounted at the shaft end.

The shift drum 91 is also rotatably supported by a bearing 103 in the crankcase 77, and is provided with a pin 104 mounted at the shaft end in a position offset from its axis center in the radial direction, and a drum rotation detection sensor 105.

Upon rotation of the second bevel gear 88, the drive gear 95 rotates, and the drive gear 95 rotates the driven sector gear 98. Then, the change arm 99 is swung, which pushes out a pin 104 which is engaged with a long hole (or U-shaped cutout) 106 formed in the leading end. As a result, the shift drum 91 is rotated by a predetermined angle. After the swinging motion, the change arm 99 is moved back into place by the pinching spring 101. Note that these component elements can be accessed from the outside by removing a lid 107.

Components downstream from the shift drum 91 will be described with reference to FIG. 4.

Figure 4:
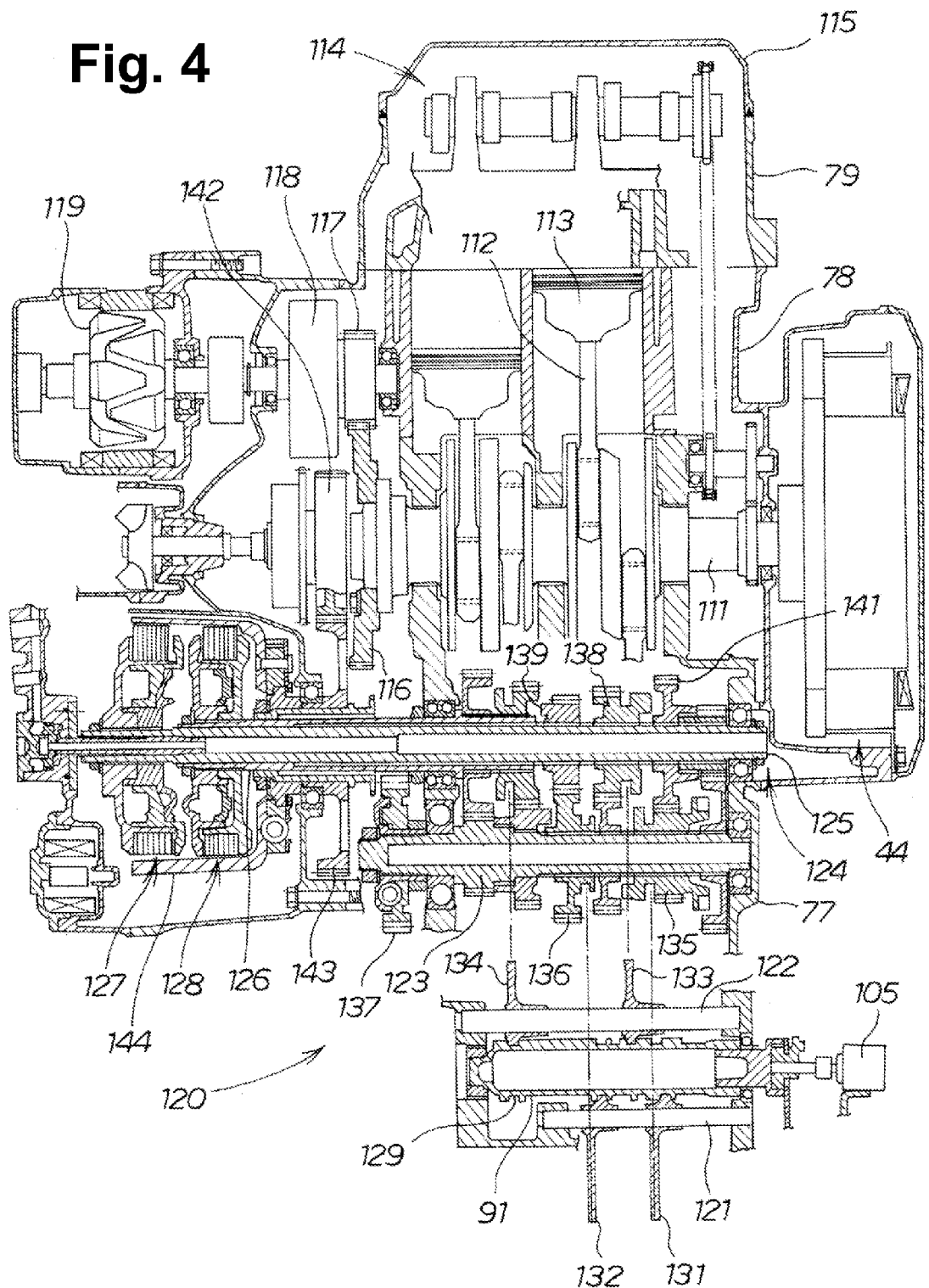
FIG. 4 is a sectional view of a power unit.

Incidentally, the motor 44 and the drum rotation detection sensor 105 are shown in the right hand side of FIG. 4 for the sake of easier understanding.

A crankshaft 111 is rotatably supported in the crankcase 77, and a piston 113 is coupled to the crankshaft 111 through a connecting rod 112. The piston 113 is reciprocatably housed in the cylinder block 78. A valve train 114 is mounted to the cylinder head 79 which closes the cylinder block 78. A head cover 115 is placed on the cylinder head 79 such that the valve train 114 is enclosed.

The motor 44 is provided at one end of the crankshaft 111, while a gear 116 is provided at the other end. A sub-gear 117 meshes with the gear 116. The sub-gear 117 is coupled to the damper 118. An AC electric motor (ACG) 119 is mounted to an output of the damper 118.

Then, a multi-stage gear transmission 120, which occupies a later-stage part of the automatic transmission mechanism, is disposed along the crankshaft 111.

The multi-stage gear transmission 120 includes a shift drum 91; two shift fork shafts 121, 122 which are disposed parallel to the shift drum 91; a second main shift shaft 123 and a first main shift shaft 124 which are disposed parallel to the shift fork shafts 121, 122 (the first main shift shaft 124 including an inner shaft 125 and an outer shaft 126); an inner-side clutch 127 which is provided at an end of the inner shaft 125; an outer-side clutch 128 which is provided at an end of the outer shaft 126; plural shift forks 131 to 134 which are mounted on the shift fork shafts 121, 122 to be allowed to move in the axis direction and are moved in the axis direction by a cam groove 129 of the shift drum 91; shifters 135, 136 which are mounted on the second main shift shaft 123 to be allowed to move in the axis direction and are moved by the shift forks 131, 132; an output takeoff gear 137 which is provided on the second main shift shaft 123 for taking the output from the same; a shifter 138 which is attached to the inner shaft 125 of the first main shift shaft 124 to be allowed to move in the axis direction and is moved by the shift fork 133; a shifter 139 which is attached to the outer shaft 126 of the first main shift shaft 124 to be allowed to move in the axis direction and is moved by the shift fork 134; and a gear 141 which form part of the multi-stage gear provided on the outer shaft 126 of the first main shift shaft 124.

An example of the operation of the multi-stage gear transmission 120 structured in this manner is described.

For example, assume that the inner-side clutch 127 is engaged, so that the shifter 138 is moved toward the motor 44 (toward the right hand in drawing) to be engaged with the gear 141.

The output of the crankshaft 111 is transmitted to a gear 142 formed integrally with the crankshaft 111, a driven gear 143 meshing with the gear 142, a clutch cup 144 rotated by the driven gear 143, the inner-side clutch 127, the inner shaft 125, the shifter 138, the gear 141, the shifter 135 meshing with the gear 141, the second main shift shaft 123 and the output takeoff gear 137 in this order.

A desired transmission ratio can be provided by selecting the inner/outer-side clutch 127, 128 and selecting the shifter 135, 136, 138, 139.

Next, the layout of the actuator 82 driving the multi-stage gear transmission 120 will be described in detail.

Figure 5:
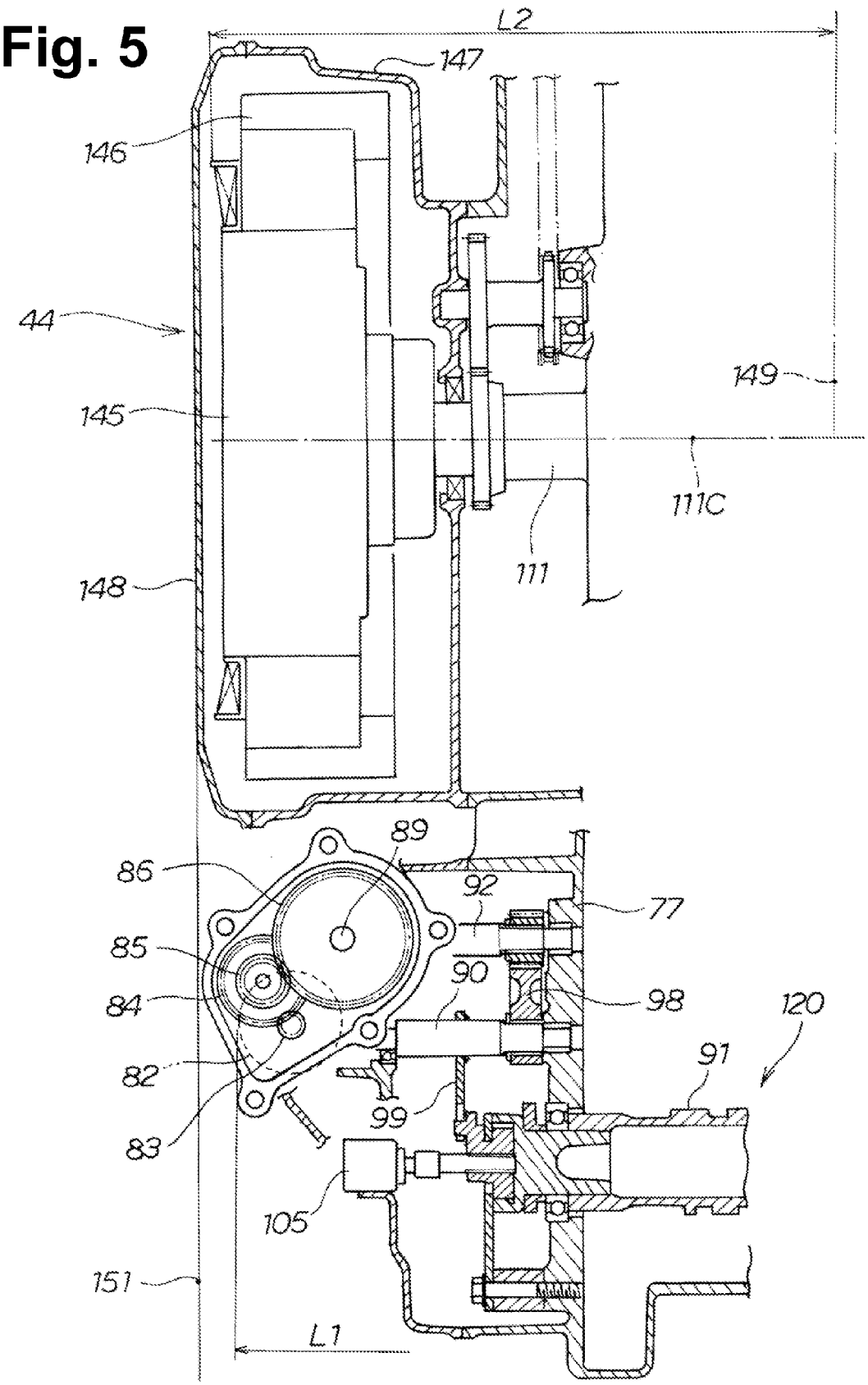
FIG. 5 is a diagram illustrating the placement of a motor and an actuator.

As shown in FIG. 5, the motor 44, which includes an inner rotor 145 and an outer stator 146, is disposed at one end of the crankshaft 111. The motor 44 is housed in a motor cover 147 formed integrally with the crankcase 77 and a lid 148 attached to the motor cover 147.

The actuator 82 and the like are mounted in the space under the motor 44.

The overhang amount L1 of the actuator 82 on an extension of the axis 111C of the crankshaft 111 (the overhang amount from the center line 149 of the cylinder located closest to the motor 44) is set to fall within a range lower than the overhang amount L2 of the motor 44 (the overhang amount from the center line 149 of the cylinder located closest to the motor 44). The overhang amount L2 is preferably a distance to the inner rotor 145, but may be a distance to the outer surface of the lid 148. Specifically, the actuator 82 is disposed inside a line 151 extended straightly downward from the outer surface of the lid 148 (closer to the center line 149 of the cylinder).

Specifically, since the actuator 82 and the motor 44 protrude in the same direction and the overhang amount of the actuator 82 is set to be lower than the overhang amount of the motor 44, it is possible to effectively use a dead space outside the crankcase 77 which is created by the installation space for the relatively large motor 44. Thus, efficient placement of the motor 44 and the actuator 82 can be achieved while an increase in size of the engine is minimized.

In addition, since the actuator 82 does not protrude beyond the motor 44, the motor 44 fulfills a role to protect the actuator 82. In other words, effects of the motor 44 protecting the actuator 82 can be expected.

Also, as shown in FIG. 2, the placement is made to allow the width W1 of the actuator 82 in a direction perpendicular to the crankshaft 111 to fall within a range lower than the width W2 of the motor 44.

As shown in FIG. 5 and FIG. 2, since the actuator 82 and the motor 44 protrude in the same direction and the overhang amount of the actuator is less than the overhang amount of the motor, there is no disadvantageous possibility of an increase in size of the engine. That is, according to the embodiment of the present invention, in a hybrid vehicle it is possible to reduce the overhang amount of an actuator when the actuator is placed in a transmission mechanism.

For information, in FIG. 5, the actuator 82 and so on can be placed not only under, but also above, on the right side or on the left side of the motor 44.

However, as shown in FIG. 5, the multi-stage gear transmission 120 is preferably disposed under the crankcase 77 and the actuator 82 is preferably disposed under the motor 44. When the motor 44 is placed at the end of the crankshaft 111, the area under the motor 44 becomes a dead space in many cases. According to the embodiment, the foregoing is because the area under the motor 44 can be effectively used.

Also, when the drum rotation detection sensor 105 is provided, the actuator 82 is desirably placed between the drum rotation detection sensor 105 and the motor 44. This is because the motor 44, the actuator 82 and the drum rotation detection sensor 105 can be methodically arranged, resulting in compact arrangement.

Also, the actuator 82 is preferably placed such that its longitudinal axis is perpendicular to the axis 111C of the crankshaft 111 (extend in the direction from the face to the reverse side of the drawing sheet in FIG. 5).

The output of the actuator 82 is dependent on an outer diameter and a length. If the outer diameter is reduced and the length is increased, the output can be maintained. In this case, the actuator 82 can be placed at right angles to the crankshaft 111, so that compact arrangement can be achieved in the direction of the crankshaft.

Also, as shown in FIG. 1, the engine 43 is desirably disposed such that the crankshaft (axis 111C) extends in the vehicle longitudinal direction, and the motor 44 and the actuator 82 are desirably disposed between the front wheel 38 of the vehicle and the engine 43. This is because the space between the front wheel 38 and the engine 43 can be effectively used.

The embodiment of the present invention is suitable for a hybrid motorcycle.

In the embodiment of the present invention, the multi-stage gear transmission is placed under the crankcase, and the actuator is placed under the motor.

In the embodiment of the present invention, the multi-stage gear transmission includes a shift drum for shifting multi-stage gears and is equipped with a drum rotation detection sensor for detecting a rotated position of the shift drum, and the actuator is placed between the drum rotation detection sensor and the motor.

In the embodiment of the present invention, the actuator is placed in a posture to make a longitudinal axis perpendicular to an axis of the crankshaft.

In the embodiment of the present invention, the engine is placed to extend the crankshaft in a longitudinal direction of the vehicle, and the motor and the actuator are placed between a front wheel of the vehicle and the engine.

In the embodiment of the present invention, an oil filter for filtering a lubricant is provided adjacent to the actuator in the crankcase, the actuator is placed offset toward one side of the vehicle and the oil filter is placed offset toward the other side of the vehicle.

In the embodiment of the present invention, the actuator is placed such that its overhang amount falls within a range lower than the overhang amount of the motor on the extension of the crankshaft and its width falls within a range lower than the width of the motor in a direction perpendicular to the crankshaft.

Since the actuator and the motor protrude in the same direction and the overhang amount of the actuator is set to be lower than the overhang amount of the motor, it is possible to effectively use a dead space outside the crankcase which is created by the installation space for the relatively large motor. Thus, efficient placement of the motor and the actuator can be achieved while an increase in size of the engine is minimized.

In addition, since the actuator does not protrude beyond the motor, effects of the motor protecting the actuator can be expected.

That is, according to the embodiment of the present invention, it is possible to provide a technique by which, in the hybrid vehicle, when the actuator is provided in the transmission mechanism, the amount of overhang of the actuator can be reduced to achieve efficient placement of the motor and the actuator and the protection of the actuator can be expected.

In the embodiment of the present invention, the actuator is placed under the motor. When a motor is placed at an end of a crankshaft, an area under the motor becomes a dead space in many cases.

According to the embodiment of the present invention, the space under the motor can be effectively used.

In the embodiment of the present invention, the actuator is placed between the drum rotation detection sensor and the motor. The motor, the actuator and the drum rotation detection sensor can be arranged methodically, resulting in compact arrangement.

In the embodiment of the present invention, the actuator is placed in a posture perpendicular to the axis of the crankshaft. The output of the actuator depends on the outer diameter and the length. The output of the actuator can be maintained even if the outer diameter is reduced while the length is increased. In this case, by placing the actuator in a position at right angles to the crankshaft, compact arrangement can be achieved in the direction of the crankshaft.

In the embodiment of the present invention, the engine is placed to extend the crankshaft in the longitudinal direction of the vehicle and the motor and the actuator are placed between the front wheel of the vehicle and the engine.

The motor and the actuator are disposed in a space between the front wheel and the engine, so that the space between the front wheel and the engine can be efficiently used.

In the embodiment of the present invention, the oil filter is placed adjacent to the actuator. The oil filter and the actuator are respectively placed offset toward one side and the other side of the vehicle.

The actuator and the oil filter which is an auxiliary machine component can be placed in a compact arrangement.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A hybrid vehicle comprising:
an engine having a crankshaft, a crankcase, and a cylinder;
a motor provided on the crankshaft;
a multi-stage gear transmission through which an output of the crankshaft is changed to be used for traveling of the vehicle; and
an actuator configured to automatically shift the multi-stage gear transmission and provided in the crankcase in proximity to the motor,
the actuator and the motor are both provided on a same side of the cylinder when viewed along a length of the crankshaft,
a radius from a center line of the cylinder to a part of the actuator farthest from the center line being shorter than a radius from the center line to a part of the motor farthest from the center line, and
the actuator having a width less than a width of the motor in a direction perpendicular to the crankshaft.

2. The hybrid vehicle according to claim 1, wherein the multi-stage gear transmission is placed under the crankcase, and the actuator is placed under the motor.

3. The hybrid vehicle according to claim 1,
wherein the multi-stage gear transmission comprises multi-stage gears, and
a shift drum configured to shift the multi-stage gears and comprising a drum rotation detection sensor configured to detect a rotated position of the shift drum; and
wherein the actuator is placed between the drum rotation detection sensor and the motor.

4. The hybrid vehicle according to claim 1, wherein the actuator has a longitudinal axis and is placed such that the longitudinal axis is perpendicular to an axis of the crankshaft.

5. The hybrid vehicle according to claim 1, wherein the engine is placed to extend the crankshaft in a longitudinal direction of the vehicle, and the motor and the actuator are placed between a front wheel of the vehicle and the engine.

6. The hybrid vehicle according to claim 1, further comprising an oil filter provided adjacent to the actuator in the crankcase and configured to filter a lubricant,
wherein the actuator is placed offset toward one side of the vehicle and the oil filter is placed offset toward another side of the vehicle.

7. The hybrid vehicle according to claim 1, wherein the engine further comprises a plurality of cylinders, and wherein the radius is defined with respect to a cylinder that is located closest to the motor.

8. The hybrid vehicle according to claim 1, wherein the actuator is provided directly beneath the motor in both longitudinal and lateral directions of the vehicle.

9. The hybrid vehicle according to claim 1, wherein the engine is placed to extend the crankshaft in a longitudinal direction of the vehicle, and wherein the motor is provided at a front end of the crankshaft in the longitudinal direction of the vehicle.

10. The hybrid vehicle according to claim 9, wherein the actuator is provided at a location along the longitudinal direction of the vehicle forward of a forward-most cylinder of the engine.

11. The hybrid vehicle according to claim 1, wherein the actuator is provided at a location along the longitudinal direction of the vehicle forward of a forward-most cylinder of the engine.

12. The hybrid vehicle according to claim 11, wherein the actuator does not extend forward of an outer surface of a lid housing the motor in the longitudinal direction of the vehicle.

13. The hybrid vehicle according to claim 11, wherein the actuator does not extend forward of a rotor of the motor in the longitudinal direction of the vehicle.

14. The hybrid vehicle according to claim 11, wherein the actuator is provided directly beneath the motor in both the longitudinal direction and a lateral direction of the vehicle.

* * * * *